(12) United States Patent
Wienhold et al.

(10) Patent No.: US 11,004,637 B2
(45) Date of Patent: May 11, 2021

(54) FIELD DEVICE LATCHING RELAY RESET

(71) Applicant: Rosemount Inc., Shakopee, MN (US)

(72) Inventors: Nicholas Aaron Wienhold, Waconia, MN (US); Justin Tai Zingsheim, Chaska, MN (US)

(73) Assignee: ROSEMOUNT INC., Shakopee, MN (US)

( * ) Notice: Subject to any disclaimer, the term of this patent is extended or adjusted under 35 U.S.C. 154(b) by 520 days.

(21) Appl. No.: 15/928,449

(22) Filed: Mar. 22, 2018

(65) Prior Publication Data

US 2019/0295793 A1 Sep. 26, 2019

(51) Int. Cl.
*H01H 47/00* (2006.01)
*G05B 19/042* (2006.01)
*H01H 47/22* (2006.01)

(52) U.S. Cl.
CPC ......... *H01H 47/001* (2013.01); *G05B 19/042* (2013.01); *H01H 47/002* (2013.01); *H01H 47/22* (2013.01); *H01H 47/226* (2013.01); *G05B 19/0423* (2013.01); *G05B 2219/24026* (2013.01)

(58) Field of Classification Search
CPC ............................ G05B 19/048; G05B 19/042; G05B 19/0423; G05B 2219/24026; H01H 47/002; H01H 47/001; H01H 47/22; H01H 47/226
See application file for complete search history.

(56) References Cited

U.S. PATENT DOCUMENTS

| 3,693,163 | A | * | 9/1972 | Johnson | G05B 15/02 700/9 |
|---|---|---|---|---|---|
| 3,936,755 | A | * | 2/1976 | Sheng | H03K 3/03 307/652 |
| 4,084,155 | A | * | 4/1978 | Herzl | G01F 15/068 340/870.39 |
| 5,318,164 | A | * | 6/1994 | Barnes | G07F 7/005 194/200 |
| 5,327,068 | A | * | 7/1994 | Lendrum | H02J 7/0031 307/10.7 |
| 5,432,386 | A | * | 7/1995 | Cerra, Jr. | G06F 1/30 307/66 |

(Continued)

FOREIGN PATENT DOCUMENTS

JP 2005-221773 8/2005

OTHER PUBLICATIONS

Product Data Sheet, Rosemount 2120 Level Switch-Vibrating Fork, 00813-0100-04030, Rev. HC, Dec. 2017, 24 pgs.

(Continued)

*Primary Examiner* — Yusef A Ahmed
(74) *Attorney, Agent, or Firm* — Westman, Champlin & Koehler, P.A.

(57) ABSTRACT

An industrial process field device includes an active component, a latching relay, a controller, a relay drive, and a reset circuit. The active component may be a sensor configured to sense a process parameter, or a control device configured to control a process of the industrial process. The controller is configured to generate a switch signal, and the relay drive is configured to set the latching relay in one of a set state and a reset state based on the switch signal. The reset circuit is configured to set the latching relay to the reset state in response to an interruption of electrical power to the relay drive.

15 Claims, 7 Drawing Sheets

(56) References Cited

U.S. PATENT DOCUMENTS

| | | | | |
|---|---|---|---|---|
| 5,436,788 | A * | 7/1995 | Wallaert | H02J 13/00036 |
| | | | | 361/160 |
| 5,438,311 | A * | 8/1995 | Lane, Sr. | B60R 25/10 |
| | | | | 180/287 |
| 6,246,562 | B1 | 6/2001 | Durif | |
| 6,355,913 | B1 * | 3/2002 | Authier | A61H 33/00 |
| | | | | 219/481 |
| 9,698,672 | B2 * | 7/2017 | Chung | H02M 3/156 |
| 10,177,646 | B2 * | 1/2019 | Chung | H02M 1/12 |
| 2004/0263183 | A1 * | 12/2004 | Naidu | G01R 31/52 |
| | | | | 324/536 |
| 2006/0148410 | A1 * | 7/2006 | Nelson | G08C 19/02 |
| | | | | 455/67.11 |
| 2006/0290328 | A1 * | 12/2006 | Orth | G01D 21/00 |
| | | | | 323/218 |
| 2008/0280568 | A1 * | 11/2008 | Kielb | G01D 21/00 |
| | | | | 455/74.1 |
| 2009/0309558 | A1 * | 12/2009 | Kielb | G05B 19/0423 |
| | | | | 323/234 |
| 2009/0311971 | A1 * | 12/2009 | Kielb | H04L 12/40045 |
| | | | | 455/74.1 |
| 2010/0270982 | A1 * | 10/2010 | Hausman, Jr. | H02J 7/00 |
| | | | | 320/166 |
| 2011/0282467 | A1 | 11/2011 | Schulte | |
| 2013/0009483 | A1 * | 1/2013 | Kawate | H02J 3/383 |
| | | | | 307/77 |
| 2016/0109871 | A1 * | 4/2016 | Phillips | H04L 67/02 |
| | | | | 700/83 |
| 2017/0288662 | A1 * | 10/2017 | Djelassi | H03K 17/08122 |
| 2018/0024195 | A1 * | 1/2018 | Takamura | H01H 9/167 |
| | | | | 324/380 |
| 2018/0375363 | A1 * | 12/2018 | Wienhold | G05F 1/613 |
| 2019/0066938 | A1 * | 2/2019 | Ishida | H01H 1/605 |
| 2019/0097416 | A1 * | 3/2019 | Schmalz | G01K 7/24 |
| 2019/0278244 | A1 * | 9/2019 | Wienhold | G01R 31/3277 |

OTHER PUBLICATIONS

U.S. Appl. No. 15/918,226, filed Mar. 12, 2018.
Notification of Transmittal of the International Search Report and the Written Opinion of the International Searching Authority, or the Declaration from International Application No. PCT/US2019/016486, dated May 9, 2019.
Communication from European Patent Application No. 19707172.3, dated Sep. 24, 2020.

* cited by examiner

FIELD DEVICE LATCHING RELAY RESET

BACKGROUND

Embodiments of the present disclosure relate to industrial process control systems for industrial plants. More specifically, embodiments of the present disclosure relate to an industrial process field device having a reset circuit for resetting a latching relay of the field device.

In industrial settings, control systems are used to monitor and control inventories of industrial and chemical processes, and the like. Typically, the control system performs these functions using industrial process field devices distributed at key locations in the industrial process and coupled to the control circuitry in the control system by a process control loop. The term "field device" refers to any device that performs a function in a distributed control or process monitoring system, including all devices currently known, or yet to be known, that are used in the measurement, control, and/or monitoring of industrial processes.

Typical field devices include device circuitry that enables the field device to perform conventional field device tasks such as process parameter monitoring and measurements using one or more sensors, and/or process control operations using one or more control devices. Exemplary sensors include pressure sensors, level sensors, temperature sensors, and other sensors used in industrial processes. Exemplary control devices include actuators, solenoids, valves, and other control devices.

The device circuitry of field devices may also include a controller that is used to control the sensors and/or control devices, and communicate with a process control system or other circuitry, over a process control loop, such as a 4-20 mA process control loop, for example. In some installations, the process control loop is used to deliver a regulated current and/or voltage to the field device for powering the field device. The process control loop can also carry data, such as a process parameter value corresponding to a sensed process parameter. This data may be communicated over the process control loop as an analog signal, or as a digital signal.

Some field devices may include a switch, such as latching relay, that is configured to connect or disconnect electrical power from an external power supply to an external device, such as a pump. The use of a latching relay conserves critical power used by the field device, but prevents the latching relay from returning to a reset condition in response to a power loss. Unfortunately, this could leave the external device in an undesired activated state, which could potentially cause damage or create a dangerous condition in the industrial plant.

SUMMARY

Embodiments of the present disclosure are directed to field devices for an industrial process, industrial process control systems, and methods of controlling a latching relay of a field device. One embodiment of the field device includes an active component, a latching relay, a controller, a relay drive, and a reset circuit. The active component may be a sensor configured to sense a process parameter, or a control device configured to control a process of the industrial process. The controller is configured to generate a switch signal, and the relay drive is configured to set the latching relay in one of a set state and a reset state based on the switch signal. The reset circuit is configured to set the latching relay to the reset state in response to an interruption of electrical power to the relay drive.

One embodiment of the industrial process control system includes a field device and a relay power supply. The field device includes an active component, a latching relay, a controller, a relay drive, and a reset circuit. The active component may be a sensor configured to sense a process parameter, or a control device configured to control a process of the industrial process. The controller is configured to generate a switch signal, and the relay drive is configured to set the latching relay in one of a set state and a reset state based on the switch signal. The relay power supply is configured to provide electrical power to the relay drive. The reset circuit is configured to set the latching relay to the reset state in response to an interruption of the electrical power supplied by the relay power supply.

In one embodiment of the method, a process parameter of an industrial process is sensed, or the industrial process is controlled using an active component of the field device. A relay drive of the field device is powered using a relay power supply. Power to an external device is controlled by setting a latching relay of the field device in one of a set state and a reset state using the relay drive based on a switch signal from a controller of the field device. A voltage supplied by the relay power supply is compared to a threshold voltage using a comparator of a reset circuit of the field device. The latching relay is set to the reset state using an electrical charge from a charge reservoir of the reset circuit when the voltage reaches a predetermined relationship to the threshold voltage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Figure 1:
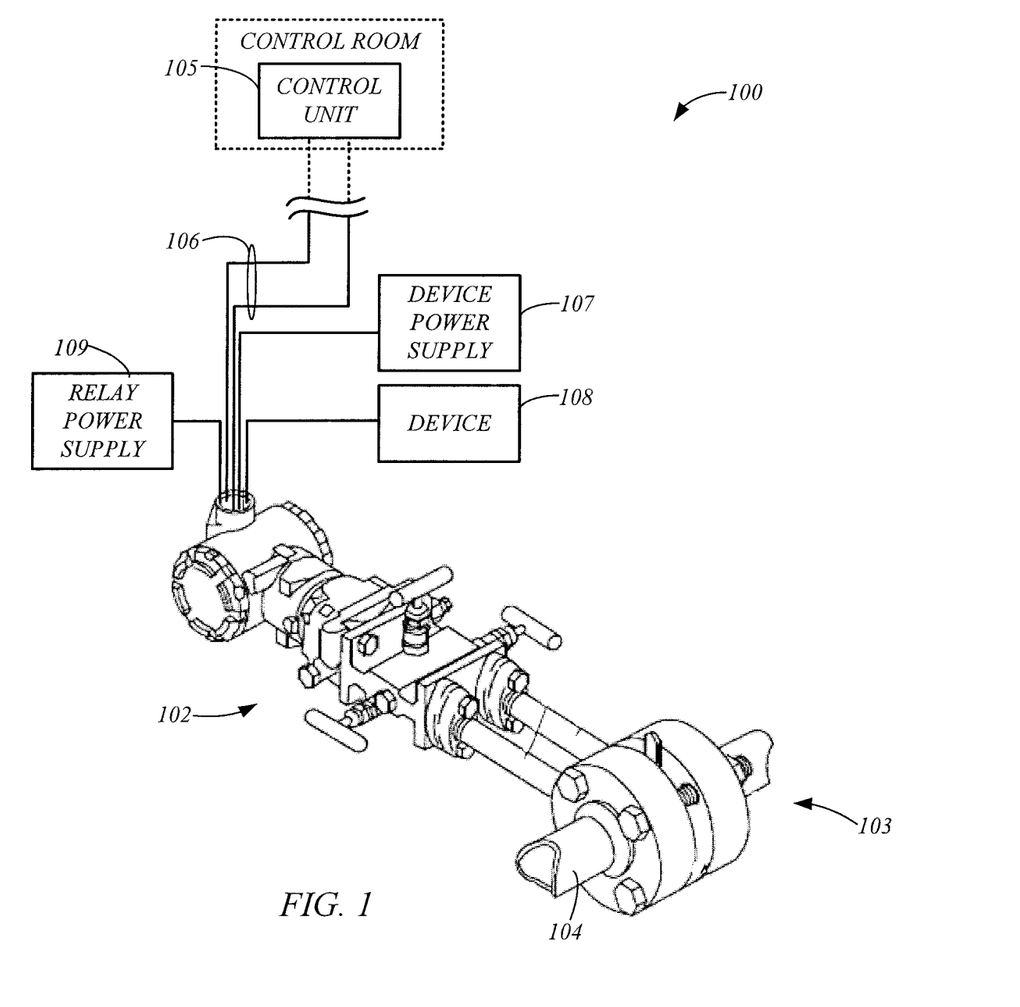
FIG. 1 is a simplified diagram of exemplary industrial process control system, in accordance with embodiments of the present disclosure.

Embodiments of the present disclosure are generally directed to industrial process field devices, industrial process control systems that include the field device, and methods of controlling an external device using the field device. FIG. 1 is a simplified diagram of exemplary industrial process measurement or control system 100, in accordance with embodiments of the present disclosure.

The system 100 includes an industrial process field device 102 that may interact with an industrial process 103. In some embodiments, the process 103 involves a material, such as a fluid, transported though pipes, such as pipe 104 (FIG. 1), and/or contained in tanks, for example, that is processed by the system 100. This processing of the material generally transforms the material from a less valuable state into more valuable and useful products, such as petroleum, chemicals, paper, food, etc. For example, an oil refinery performs industrial processes that can process crude oil into gasoline, fuel oil, and other petrochemicals.

The field device 102 may communicate with a computerized control unit 105, which may be configured to control the field device 102. The control unit 105 may be remotely located from the field device, such as in a control room for the system 100, as shown in FIG. 1. The field device 102 may be connected to the control unit 105 over a two-wire process control loop 106, such as a 4-20 milliamp process control loop. In addition to communicating data over the control loop 106, such as by controlling the current through the control loop, the control loop 106 may fully power the field device 102.

The field device 102 may be configured to switch power from a device power supply 107 to a device 108, which are external to the field device 102. Exemplary embodiments of the device 108 include, for example, a pump, a compressor, a solenoid, or another device that may be suitable for use with the system 100.

As discussed below, a latching relay is used to perform this switching function in the field device 102. The latching relay may be powered by a relay power supply 109, which is external to the field device 102. A controller of the field device 102, which may be electrically isolated from the relay power supply 109, generates signals that are used to direct the latching relay into its set state, in which power from the supply 107 may be connected to the device 108, and its reset state, in which power from the supply 107 may be disconnected from the device 108.

The latching relay maintains its set state (e.g., closed switch) or reset state (e.g., open switch) after a power loss to the relay supply, while the non-latching relay reverts to its reset state in response to a power loss. The latching relay is selected over the non-latching relay because the latching relay generally requires lower power signals from the controller, which allows the field device 102 to meet critical low-power requirements while providing the switching function between the device power supply 107 and the device 108.

However, it remains desirable for the field device 102 to have the resetting function of the non-latching relay to prevent, for example, the external device 108 from remaining activated after a power loss and causing damage or creating a dangerous condition. Embodiments of the present disclosure are directed to a field device 102 having a reset circuit that operates to reset the latching relay upon detection of a power interruption from the relay power supply 109. Thus, the reset circuit provides the field device 102 with the desired resetting function of the non-latching relay, while allowing the field device 102 to meet its low power requirements.

Before discussing the reset circuit in detail, various embodiments of the field device 102 will be discussed with reference to FIG. 2, which is a simplified block diagram an exemplary industrial process control system 100, in accordance with embodiments of the present disclosure. The control unit 105 may be communicatively coupled to the field device 102 over a suitable physical communication link, such as the control loop 106, or a wireless communication link. Communications between the control unit 105 and the field device 102 may be performed over the control loop 106 in accordance with conventional analog and/or digital communication protocols. In some embodiments, the process control loop 106 includes a 4-20 milliamp process control loop, in which a process variable may be represented by a level of a loop current I (FIG. 2) flowing through the process control loop 106. Exemplary digital communication protocols include the modulation of digital signals onto the analog current level of the two-wire process control loop 106, such as in accordance with the HART® communication standard. Other purely digital techniques may also be employed including Fieldbus and Profibus communication protocols.

Figure 2:
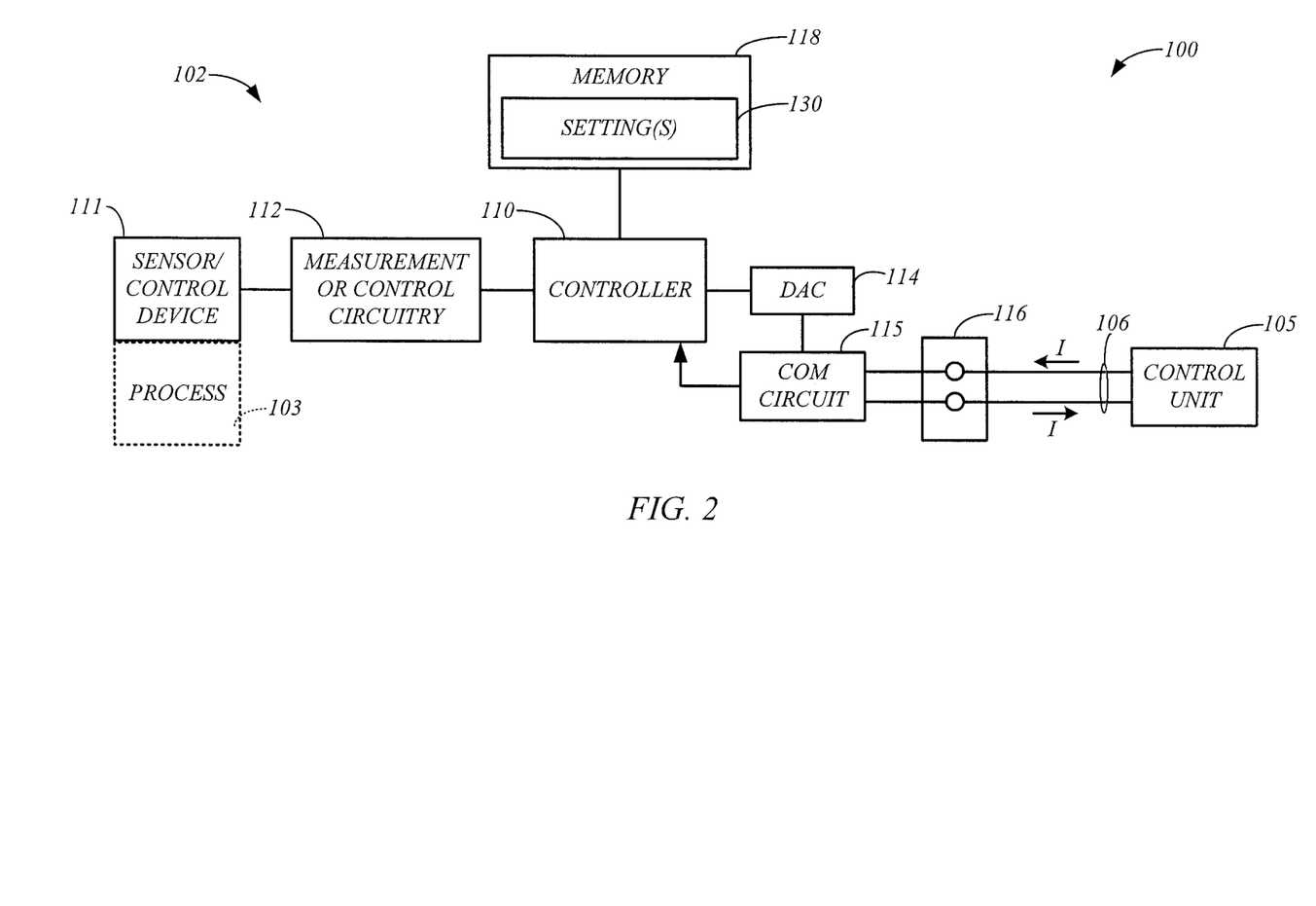
FIG. 2 is a simplified block diagram of exemplary industrial process control system, in accordance with embodiments of the present disclosure.

In some embodiments, the field device 102 includes a controller 110, an active component in the form of one or more sensors or control devices 111, measurement or control circuitry 112, a digital-to-analog converter (DAC) 114, a communications circuit 115, and/or a terminal block 116, as shown in the simplified block diagram of FIG. 2. The controller 110 may represent one or more processors (i.e., microprocessor, central processing unit, etc.) that control components of the field device 102 to perform one or more functions described herein in response to the execution of instructions, which may be stored locally in patent subject matter eligible computer readable media or memory 118 of the device 102. In some embodiments, the processors of the controller 110 are components of one or more computer-based systems. The controller 110 may include one or more control circuits, microprocessor-based engine control systems, one or more programmable hardware components, such as a field programmable gate array (FPGA), that are used to control components of the device 102 to perform one or more functions described herein. The controller 110 may also represent other conventional field device circuitry.

The field device 102 may be used to sense or measure a parameter of the process 103, such as a temperature, a level, a pressure, a flow rate, or another parameter of the process 103 using one or more sensors represented by block 111 in FIG. 2. Exemplary sensors 111 include pressure sensors, temperature sensors, level sensors, flow rate sensors, and/or other sensors used to sense or measure a process parameter.

The field device 102 may also be configured to control an aspect of the process 103 using one or more control devices represented by block 111 in FIG. 2. Exemplary control devices 111 include actuators, solenoids, valves, and other conventional process control devices used in field devices to control a process.

The measurement or control circuitry 112 represents circuitry that interacts with the sensor or the control device 111. For instance, the circuitry 112 may include measurement circuitry that translates an output from a sensor 111 for use by a controller 110 of the field device. The DAC 114 may be used by the controller 110 to convert digital signals into analog signals that are communicated to the control unit 105 using the communications circuit 115, such as over the two-wire process control loop 106 by adjusting the loop current I to indicate a value of a process parameter sensed by the sensor 111, for example. The circuitry 112 may also be used to control a control device 111, such as in response to commands from the control unit 105 or another source, that are received by the controller 110 through the communications circuit 115, for example.

As discussed above, the field device 102 of the present disclosure is configured to control power to the device 108 from the power supply 107. These embodiments will initially be described with reference to FIG. 3, which is a simplified block diagram of a field device 102 that includes a latching relay 120 that is coupled to a device power supply 107 and a device 108, and is powered by a relay power supply 109. In some embodiments, the power supply 107, the device 108 and the relay power supply 109 are each external to the field device 102.

Figure 3:
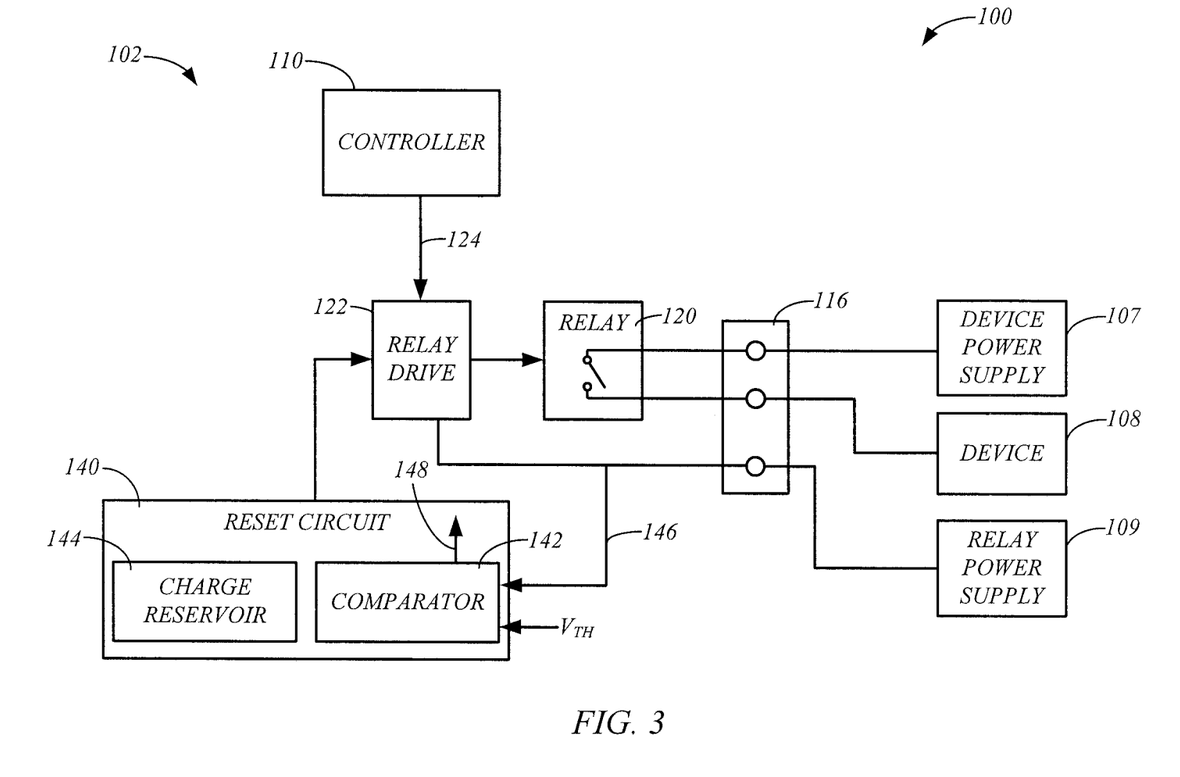
FIG. 3 is a simplified block diagram of a field device coupled to a device and power supplies that are external to the field device, in accordance with embodiments of the present disclosure.

The latching relay 120 is configured to connect or disconnect power from the device power supply 107 to the device 108, which may be connected to the latching relay 120 through, for example, the terminal block 116. The latching relay 120 may take on any suitable form, such as a single coil latching relay, or a double coil latching relay. While only a single latching relay 120 is illustrated, it is understood that the field device 102 may include multiple latching relays 120, each of which may be configured and controlled in accordance with embodiments described herein.

The latching relay 120 may be driven between set and reset states using a relay drive 122, which is powered by the relay power supply 109. Voltage regulators and converters, which may be employed by the field device 102 to control the delivery of electrical power from the power supply 109 to the relay drive 122 and other components of the field device, are not shown to simplify the drawings.

The controller 110 controls the setting of the latching relay 120 in either the set or reset state using one or more signals represented by a switch signal 124, which is received by the relay drive 122. One reason for using the latching relay 120 over a non-latching relay, is that the switch signal 124 generated by the controller 110 to change the state of the latching relay 120 is typically in the form of a brief voltage pulse, which can save valuable field device power. As discussed below, the controller 110 and other components of the field device 102 may be electrically isolated from the latching relay 120, the relay drive 122, and/or the relay power supply 109, using suitable isolation circuitry. Thus, the switch signal 124 may be delivered either directly to the relay drive 122 or indirectly to the relay drive 122 through isolation circuitry.

In some embodiments, the latching relay 120 operates as a switch in a circuit connecting a device power supply 107 and a device 108, as shown in FIG. 3. The set and reset states of the latching relay 120 each correspond to a closed state, in which the latching relay 120 electrically connects or closes the circuit connecting the device 108 to electrical power from the power supply 107, and an open state, in which the latching relay 120 disconnects or opens the circuit connecting the device 108 to the power supply 107. In some embodiments, the set state of the latching relay 120 corresponds to the closed state, and the reset state corresponds to the open state. Thus, when the latching relay 120 is in the reset state, power from the supply 107 is disconnected from the device 108.

The controller 110 may selectively set (i.e., control, actuate or toggle) the latching relay 120 between the set state and reset states to activate or deactivate the device 108, using the switch signal 124. In some embodiments, the controller 110 is configured to set the latching relay 120 in either the set or reset state in response to processor-executed instructions based on one or more settings. The settings and programmed instructions may be stored in the memory 118 (FIG. 2) as settings 130, memory of the control unit 105, and/or stored in another suitable location. The settings 130 may include user-defined settings, such as threshold values and/or other switch control parameters.

In one embodiment, the controller 110 sets the latching relay 120 in the set or reset state in response to a sensed parameter (e.g., pressure, level, flow, temperature, etc.) detected by the sensor 111. For example, the controller 110 may compare a sensed parameter value output from the circuitry 112 based on a parameter output from the sensor 111 to a setting 130, such as a user-defined threshold value, and set the latching relay 120 to a predetermined set or reset state using the switch signal 124 when the sensed parameter value meets a predetermined relationship to the threshold value.

Alternatively, the control unit 105 may receive the sensed parameter value from the field device 102, and issue a command to the controller 110, such as over the control loop 106, to set the latching relay 120 in a desired state, when the sensed parameter value meets a predetermined relationship to a setting 130, such as a user-defined threshold value. The controller 110 then produces the switch signal 124 to set the latching relay 120 in the desired state in response to the command from the control unit 105.

In one example, the field device 102 may include a level sensor 111 that senses a level in a tank, and communicates the sensed level to the control unit 105 using the communications circuit 115. When the level output generated by the sensor 111 indicates a sensed level that falls below a threshold value (e.g., setting 130), the controller 110 may be configured, or commanded by the control unit 105, to set the latching relay 120 in the set state to activate an external pump (device 108) and drive additional material into the tank. After the level sensed by the sensor 111 reaches another threshold level (setting 130), such as one indicating that the tank is full, the controller 110 may be configured or commanded to reset the latching relay 120 to deactivate the pump.

In another embodiment, the controller 110 sets the latching relay 120 in the set or reset state in response to a state of the control device 111 using the switch signal 124. Alternatively, the control unit 105 may issue a command to the controller 110 to set the latching relay 120 in either the set or reset state based on a state of the control device 111. Here, the control device 111 includes at least two different states, such as, for example, an open or closed state of a valve, a position of an actuator or solenoid, or another state of the control device 111. For example, when the control device 111 is a valve and the device 108 is a pump, the controller 110 may be configured or commanded to set the latching relay 120 in the set position when the valve is open to activate the pump and drive a flow of material through the valve, and the controller 110 may be configured or commanded to set the latching relay 120 to the reset position when the valve is closed to deactivate the pump.

Unlike a non-latching relay, which will revert to its reset state in response to an interruption of power to the relay, the latching relay 120 will remain in its current set or reset state even after a loss of power. Thus, when power from the relay power supply 109 is interrupted, the latching relay 120 will remain in its current state, and will not change its state in response to switch signals 124 from the controller 110. This could lead to the device 108 being left in either an undesired activated or deactivated state. For example, when the device 108 is a pump, a loss of power from the power supply 109 could leave the pump running without the ability of the controller 110 to switch it off, which could result in major issues, such as the overfilling of a tank, for example.

As discussed above, some embodiments of the field device 102 of the present disclosure include a reset circuit 140 that is configured to set the latching relay 120 in the reset state in response to an interruption of power (e.g., power reduction, power loss, power spike, etc.) from the relay power supply 109. Thus, the reset circuit 140 can deactivate the device 108 in response to a power interruption from the power supply 109 when the reset state of the relay 120 opens the circuit connecting the device power supply 107 to the device 108. Alternatively, the reset circuit 140 can activate the device 108 in response to a power interruption from the supply 109 when the reset state of the relay 120 closes the circuit connecting the device power supply 107 to the device 108.

In some embodiments, the reset circuit 140 includes a comparator 142 and a charge reservoir 144. The comparator 142 is configured to detect an interruption of electrical power from the relay power supply 109. The charge reservoir 144 stores an electrical charge that is used by the reset circuit 140 to set the latching relay 120 in the reset state when the comparator 142 detects an interruption of electrical power from the relay power supply 109.

The charge reservoir 144 may take on any suitable form. For example, the charge reservoir 144 may comprise one or more bulk capacitors or a rechargeable battery. The charge reservoir 144 may also be charged using power from the relay power supply 109.

In some embodiments, the comparator 142 compares a sampled voltage 146 supplied by the relay power supply 109, represented by arrow 146, to one or more threshold voltages $V_{TH}$. The comparator may output a reset signal 148 when the sampled voltage 146 reaches a predetermined relationship to the threshold voltage $V_{TH}$, which indicates an interruption of power from the relay power supply 109. In some embodiments, the threshold voltage $V_{TH}$ is set to indicate a loss or reduction of power supplied by the power supply 109 that could prevent the relay drive 122 from changing the state of the latching relay 120. Accordingly, exemplary predetermined relationships include the sampled voltage 146 matching the threshold voltage $V_{TH}$, or dropping below the threshold voltage $V_{TH}$. Power spikes or other types of power interruptions may also be detected by the comparator 142 using appropriate voltage thresholds $V_{TH}$ and corresponding predetermined relationships.

The reset signal 148 generated by the comparator 142 causes the latching relay 120 to be set in the reset state using the electrical charge stored in the charge reservoir 144. This may be achieved using any suitable technique, including those discussed in greater detail below.

Figure 4:
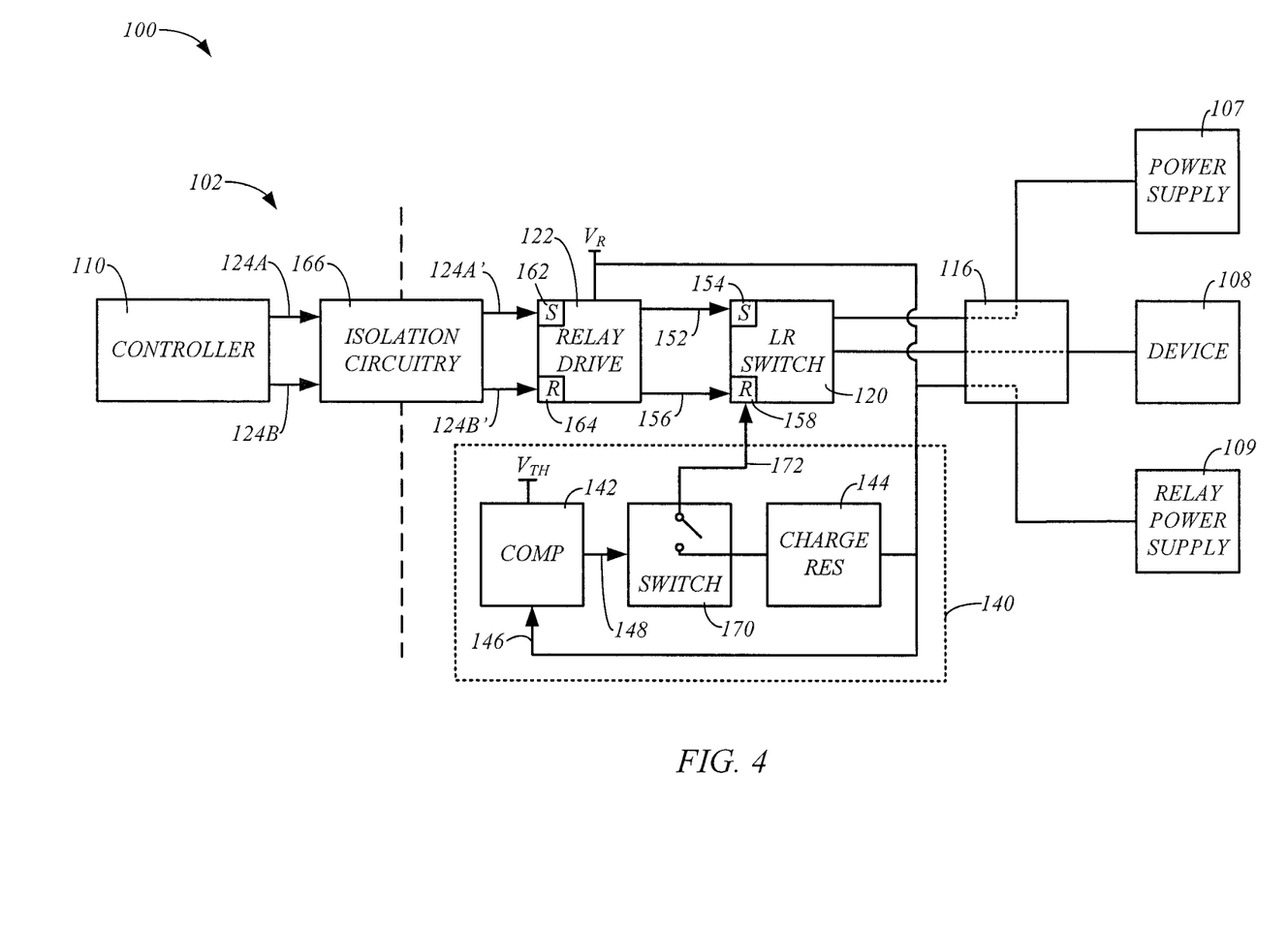
FIGS. 4 and 5 are simplified block diagrams of industrial process control systems each illustrating an exemplary circuit of a field device for resetting a latching relay during a power interruption, in accordance with embodiments of the present disclosure.

FIG. 4 is a simplified block diagram of an industrial process control system 100 including an exemplary circuit of a field device 102 for resetting a latching relay 120 during a power interruption, in accordance with embodiments of the present disclosure. The latching relay 120 may be a dual coil latching relay that is configured to receive a predetermined set signal 152, at a set input 154 to place the latching relay 120 in the set state, and a predetermined reset signal 156, at a reset input 158 to place the latching relay 120 in the reset state. The setting signal 152 and the resetting signal 156 may be generated by the relay drive 122 in response to switch signals 124, such as signals 124A and 124B, generated by the controller 110, received at corresponding set and reset inputs 162 and 164 of the relay drive 122.

While the latching relay 120 shown in FIG. 4 and elsewhere may be depicted as a dual coil latching relay 120, it is understood that the depicted dual coil latching relay 120 may be replaced by a single coil latching relay that receives predetermined set and reset signals from the relay drive 122 in response to switch signals 124 from the controller 110 to place the latching relay 120 in the set or reset state. Accordingly, embodiments of the present disclosure may utilize a single coil latching relay as the latching relay 120.

As mentioned above, the controller 110 may be electrically isolated from the latching relay 120, the relay drive 122, the relay power supply 109, the device power supply 107, and/or the device 108 by suitable isolation circuitry 166, as indicated by the dashed line in FIG. 4. Exemplary isolation circuitry 166 includes an optocoupler or a digital isolator. The isolation circuitry 166 may also isolate other circuitry of the field device 102 from the latching relay 120 and the relay drive 122, such as the communication circuit 115, the measurement or control circuitry 112, the sensor or control device 111, and/or additional circuitry of the field device 102.

The isolation circuitry 166 receives the switch signals 124, such as signals 124A and 124B, from the controller 110, and delivers corresponding isolated signals 124', such as 124A' and 124B', to the relay drive 122 using conventional isolation circuitry techniques. The relay drive 122 then outputs the corresponding set signal 152 or the reset signal 156 in response to the signals 124A' and 124B' to the latching relay 120 to set the latching relay 120 in the corresponding set or reset state.

The relay power supply 109 provides electrical power to components of the field device 102 that are isolated from the controller 110 by the isolation circuitry 166. Those skilled in the art understand that the field device 102 may include conventional voltage regulators and converters that ensure that the components receive the desired form of electrical power from the power supply 109. As mentioned above, these components are not illustrated in order to simplify the drawings.

The relay drive 122 may be powered by a relay voltage $V_R$ that is supplied by the relay power supply 109, such as through the terminal block 116, as indicated in FIG. 4. The relay drive 122 uses the relay voltage $V_R$ to generate the signals 152 and 156 in response to the switch signals 124A and 124B to drive the latching relay 120 to the set or reset state.

As mentioned above, the comparator 142 of the reset circuit 140 receives the sample voltage 146, which is generated using power from the relay power supply 109, and the threshold voltage $V_{TH}$. Additionally, the charge reservoir 144 may be charged using power from the relay power supply 109.

In some embodiments, the reset circuit 140 includes a switch 170 that is configured to connect or disconnect the charge reservoir 144 to the reset input 158 of the latching relay 120, based on the reset signal 148 from the comparator 142. The switch 170 may take on any suitable form, such as, for example, a metal-oxide silicon field effect transistor (MOSFET), or another suitable transistor switch. During normal operation of the relay power supply 109, such as when the sampled voltage 146 does not reach the predetermined relationship to the threshold voltage $V_{TH}$, the switch 170 is open, thereby disconnecting the charge reservoir 144 from the reset input 158. This setting of the switch 170 in the open state may be controlled by the signal 148 from the comparator 142. When the sampled voltage 146 reaches the predetermined relationship to the threshold voltage $V_{TH}$, the comparator 142 generates a form of the reset signal 148 that closes the switch 170 and connects the charge reservoir 144 to the reset input 158 of the latching relay 120. The electrical charge stored by the charge reservoir 144 delivers a reset signal 172 to the reset input 158, which drives the latching relay 120 into the reset state. This setting of the latching relay in the reset state may disconnect power from the supply 107 to the device 108.

Figure 5:
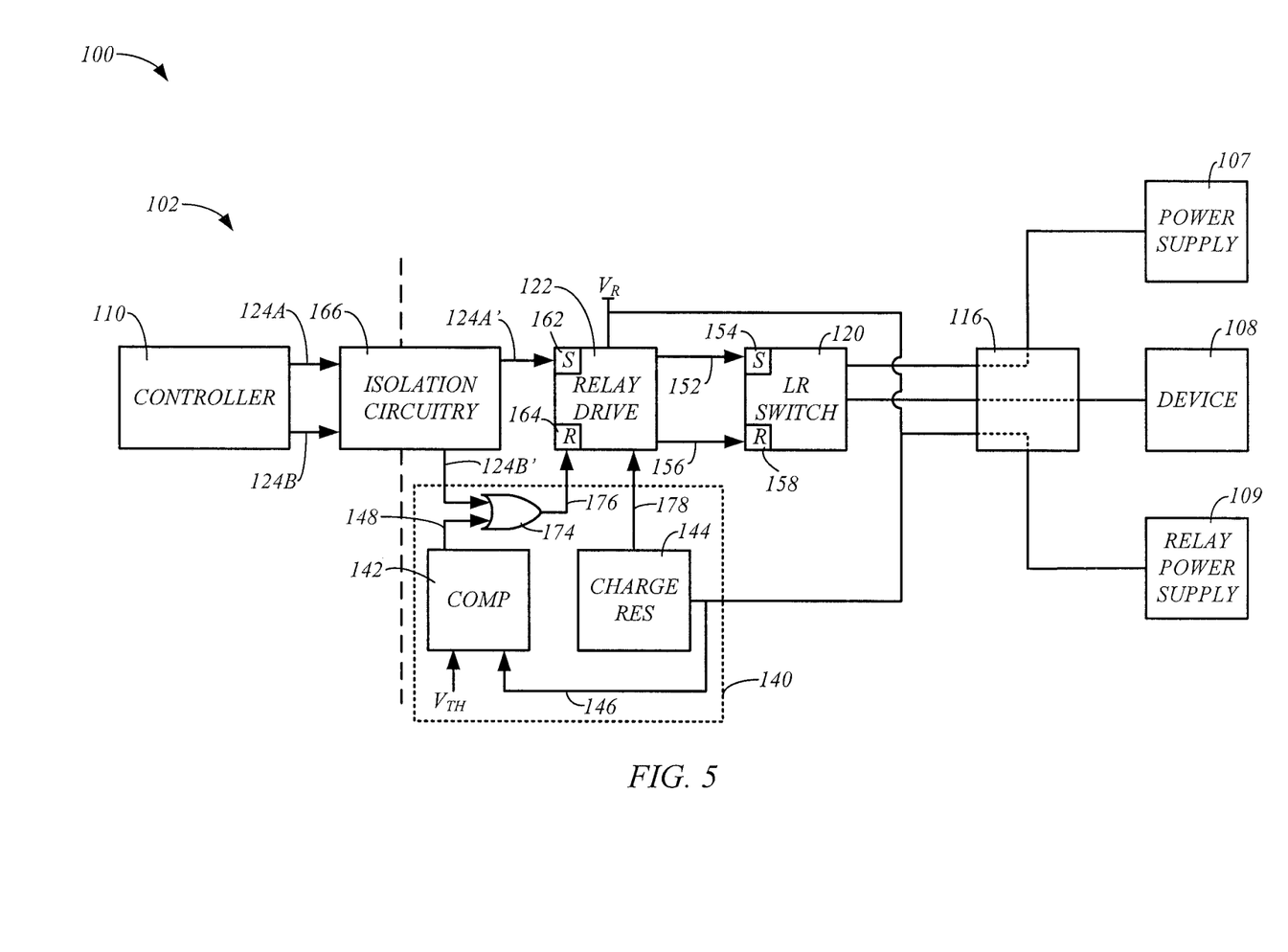

FIG. 5 is a simplified block diagram of an industrial process control system 100 including an exemplary circuit of a field device 102 for resetting a latching relay 120 during a power interruption, in accordance with embodiments of the present disclosure. The field device circuit of FIG. 5 operates substantially similarly to that of FIG. 4, but uses a different configuration for the reset circuit 140. In particular, an OR-gate 174 is used, which receives the reset signal 124B' from the isolation circuitry 166 and the reset signal 148 output by the comparator 142. An output 176 from the OR-gate 174 is connected to the reset input 164 of the relay drive 122. When the controller 110 provides a reset signal 124B, the reset signal 124B' is generated by the isolation circuitry 166 if sufficient power is available, and during a power interruption that is detected by the comparator 142 when the sampled voltage 146 drops below the threshold voltage $V_{TH}$, the comparator 142 provides the reset signal 148. In either of these situations, the output 176 from the OR-gate 174 triggers the relay drive 122 to provide the necessary reset signal 156 to reset the latching relay 120.

During an interruption of power from the relay power supply 109 the reset signal 148 generated by the comparator 142 is fed to the reset input 164 of the relay drive as output 176 from the OR-gate 174, the relay drive 122 may lack sufficient power from the relay voltage $V_R$ to produce the necessary reset signal 156. This issue is overcome using the charge reservoir 144, which provides a sufficient electrical charge (arrow 178) to power the relay drive 122 such that it can generate the reset signal 156, and reset the latching relay 120.

Figure 6:
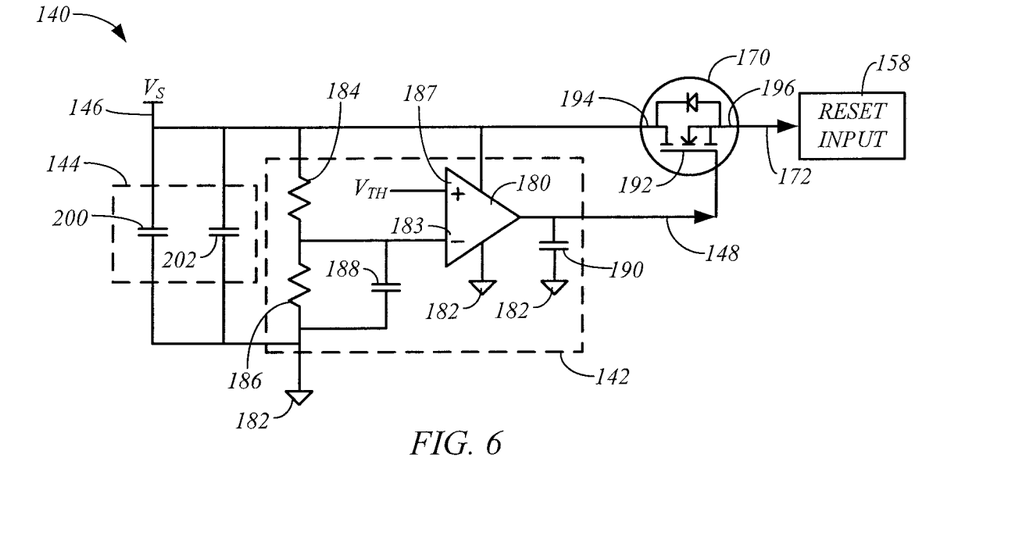
FIG. 6 is a circuit diagram of an exemplary reset circuit, in accordance with embodiments of the present disclosure.

FIG. 6 is a circuit diagram of one exemplary reset circuit 140 of many possible configurations that may be used in the arrangement illustrated in FIG. 4. In one exemplary embodiment, the comparator includes an operational amplifier (op-amp) 180, which may have a positive power supply input coupled to the sampled voltage 146 ($V_S$) (e.g., 14V), which could, for example, be the voltage $V_R$ supplied to the relay drive 122, and a negative power supply input coupled to electrical ground 182. The op-amp 180 compares a divided level of the sampled voltage 146 at the negative input 183, which is set by the voltage divider formed by resistors 184 and 186, to the threshold voltage $V_{TH}$(e.g., 12V) at the positive input 187, which may be set using conventional techniques. Capacitors 188 and 190 may be used to filter noise that could cause false detections of a power interruption.

The switch 170 may be an n-channel enhancement mode MOSFET, as shown in FIG. 6. In this exemplary embodiment, the gate 192 of the MOSFET 170 is coupled to the output 148 from the op-amp, the drain 194 is coupled to the sampled voltage $V_S$, and the source 196 is coupled to the reset input 158 of the latching relay 120, for example.

As mentioned above, the charge reservoir 144 may comprise a battery or one or more bulk capacitors. In the exemplary circuit of FIG. 6, the charge reservoir 144 is formed using bulk capacitors 200 and 202. The capacitors 200 and 202 store an electrical charge based on power supplied by the relay power supply 109, such as from the sampled voltage $V_S$. The capacitors 200 and 202 are sized appropriately to form the reset signal 172 having the required voltage over a required duration to reset the latching relay 120.

During normal operation when power is supplied by the relay power supply 109 without interruption, the divided level of the sampled voltage $V_S$ input to the op-amp 180 is greater than the threshold voltage VH. This produces a negative voltage output as the signal 148 to the gate 192 of the MOSFET 170, thereby creating an open circuit between the drain 194 and the source 196 and disconnecting the charge reservoir 144 from the reset input 158. Thus, the reset signal 172 is not produced.

When power from the relay power supply 109 is interrupted, the sampled voltage $V_S$ will begin to drop in value. When the divided level of the sampled voltage $V_S$ drops below the threshold voltage $V_{TH}$, the op-amp 180 produces a positive voltage output as the signal 148. The signal 148 applies a sufficient forward bias to the gate 192 to connect the charge reservoir 144 to the reset input 158, and the electrical charge stored by the capacitors 200 and 202 generates the reset signal 172. The reset signal 172 actuates the latching relay 120 to the reset state, which may disconnect the device 108 from the power supply 107, for example.

The voltage divider and the threshold voltage $V_{TH}$ can be selected to accommodate any latching relay 120 by producing the desired output signal 172 during an interruption of power from the relay power supply 109. For example, the G6CU-2114P-US relay produced by Omron Electronics is a single coil latching type relay, which requires the reset signal 172 to be at least a 20 millisecond pulse of voltage between 8.4V and 15.6V on the reset coil (i.e., reset input 158) to reset the relay. The voltage divider formed by resistors 184 and 186, the threshold voltage $V_{TH}$, and the bulk capacitors 200 and 202 may be selected to provide this or another suitable reset signal 172 during an interruption of power from the relay power supply 109.

Figure 7:
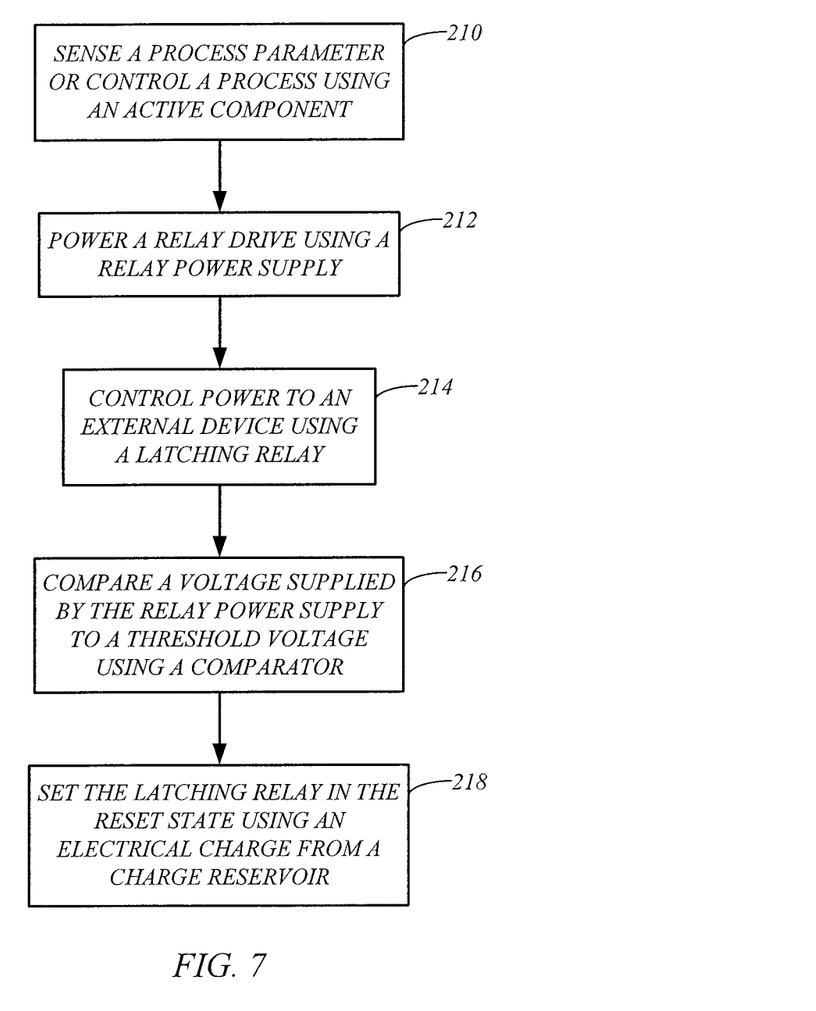
FIG. 7 is a flowchart of an exemplary method of controlling power switching in a field device for an industrial process control system.

Additional embodiments of the present disclosure are directed to methods of controlling power switching in a field device 102 for an industrial process control system 100. FIG. 7 is a flowchart illustrating one exemplary method. At 210, a process parameter of an industrial process 103 is sensed, or the industrial process 103 is controlled, using an active component 111 of the field device 102 and, at 212, a relay drive 120 of the field device 102 is powered using a relay power supply 109, such as discussed above with regard to FIG. 3, for example.

At 214, power to an external device 108 is controlled using a latching relay 120. The device 108 may be coupled to the latching relay 120 through a terminal block 116 of the field device, such as shown in FIGS. 3-5, or through another suitable connection. In some embodiments of step 214, power to the device 108 is controlled by setting the latching relay 120 in either a set state or a reset state using the relay drive 122 based on a switch signal 124 from a controller 110 of the field device 102, as discussed above.

At 216, a voltage (e.g., sampled voltage $V_S$) supplied by the relay power supply 109 is compared to a threshold voltage $V_{TH}$ using a comparator 142 of a reset circuit 140 of the field device 102. At 218, the latching relay 120 is set to the reset state using a charge reservoir 144 of the reset circuit 140 when the voltage reaches a predetermined relationship to the threshold voltage $V_{TH}$, which indicates an interruption of power from the relay power supply 109. In some embodiments, this resetting of the latching relay 120 disconnects power to the external device 108.

Although the embodiments of the present disclosure have been described with reference to preferred embodiments, workers skilled in the art will recognize that changes may be made in form and detail without departing from the spirit and scope of the present disclosure.

What is claimed is:

1. A field device for an industrial process configured to control an active component comprising a control device configured to control a process parameter of the industrial process, the field device comprising:
   a latching relay configured to connect an external device, electrically coupled to the latching relay, to a device power supply, electrically coupled to the latching relay and configured to power the external device, through the latching relay based upon a set state of the latching relay and a reset state of the latching relay;
   a controller configured to generate a switch signal;
   a relay drive configured to set the latching relay in one of the set state and the reset state based on the switch signal; and
   a reset circuit configured to set the latching relay to the reset state in response to an interruption of electrical power to the relay drive by applying power to the latching relay stored in a charge reservoir;
   wherein the relay drive is powered by a relay voltage from a relay power supply; and
   the reset circuit comprises:
      a comparator configured to detect the interruption of electrical power from the relay power supply;
      wherein the reset circuit sets the latching relay in the reset state when the comparator detects the interruption of electrical power from the relay power supply using an electrical charge from the charge reservoir.

2. The field device of claim 1, wherein the charge reservoir comprises a bulk capacitor.

3. The field device of claim 2, wherein the bulk capacitor is charged by the relay power supply.

4. The filed device of claim 1, wherein:
   the comparator compares a sampled voltage supplied by the relay power supply to a threshold voltage, and generates a reset signal when the sampled voltage reaches a predetermined relationship to the threshold voltage; and
   the reset circuit sets the latching relay to the reset state in response to the reset signal.

5. The field device of claim 4, wherein:
   the reset circuit comprises a switch between the charge reservoir and the latching relay;
   the comparator actuates the switch to electrically couple the charge reservoir to the latching relay using the reset signal; and
   the latching relay is set to the reset state in response to the electrical coupling of the charge reservoir to the latching relay.

6. The field device of claim 1, wherein:
   the relay drive is electrically coupled to the relay power supply through a terminal block of the field device; and
   the field device comprises isolation circuitry that electrically isolates the controller from the relay drive.

7. The field device of claim 6, wherein the isolation circuitry comprises a digital isolator or an optocoupler.

8. The field device of claim 1, wherein the active component comprises the control device, which is selected from the group consisting of an actuator, a valve, and a solenoid.

9. An industrial process control system comprising:
   a field device configured to control an active component comprising a control device configured to control a process of the industrial process;
   an external device electrically coupled to a latching relay;
   a device power supply electrically coupled to the latching relay and configured to power the external device through the latching relay;
   the latching relay is configured to connect the external device to the device power supply through the latching relay based upon a set state and a reset state of the latching unit;
   a controller configured to generate a switch signal;
   a relay drive configured to set the latching relay in one of the set state and the reset state based on the switch signal;
   a reset circuit; and
   a relay power supply configured to provide electrical power to the relay drive;
   wherein the reset circuit is configured to set the latching relay to the reset state in response to an interruption of the electrical power supplied by the relay power supply by applying power to the latching relay stored in a charge reservoir;
   wherein the relay drive is powered by a relay voltage supplied by the relay power supply; and
   the reset circuit comprises:
      a comparator configured to detect the interruption of electrical power from the relay power supply;
      wherein the reset circuit sets the latching relay in the reset state when the comparator detects the interruption of electrical power from the relay power supply using an electrical charge from the charge reservoir.

10. The system of claim 9, wherein the charge reservoir comprises a bulk capacitor.

11. The system of claim 9, wherein:
   the comparator compares a sampled voltage supplied by the relay power supply to a threshold voltage, and generates a reset signal when the sampled voltage reaches a predetermined relationship to the threshold voltage; and
   the reset circuit comprises logic that sets the latching relay to the reset state in response to the reset signal.

12. The system of claim 11, wherein:
   the reset circuit comprises a switch between the charge reservoir and the latching relay;
   the comparator actuates the switch to electrically couple the charge reservoir to the latching relay using the reset signal; and
   the latching relay is set to the reset state in response to the electrical coupling of the charge reservoir to the latching relay.

13. The system of claim 9, wherein:
   the relay drive is electrically coupled to the relay power supply through a terminal block of the field device; and
   the field device comprises isolation circuitry that electrically isolates the controller from the relay drive.

14. The system of claim 9, wherein the external device is selected from the group consisting of a pump, a solenoid, and a compressor.

15. A method of controlling a latching relay of a field device for an industrial process comprising:
- controlling a process parameter of the industrial process using a control device of an active component of the field device;
- powering a relay drive of the latching relay using a relay power supply;
- controlling power to an external device comprising setting the latching relay of the field device in one of a set state and a reset state in which the latching relay is configured to connect the external device, electrically coupled to the latching relay, to a device power supply, electrically coupled to the latching relay and configured to power the external device, through the latching based on a switch signal from a controller of the field device;
- comparing a voltage supplied by the relay power supply to a threshold voltage using a comparator of a reset circuit of the field device; and
- setting the latching relay in the reset state with the switch signal using an electrical charge stored in a charge reservoir of the reset circuit when the voltage reaches a predetermined relationship to the threshold voltage.

* * * * *